United States Patent
Lee et al.

(10) Patent No.: US 7,032,439 B2
(45) Date of Patent: Apr. 25, 2006

(54) ENGINE MISFIRE DETECTION USING SYSTEM IDENTIFICATION TECHNOLOGY

(75) Inventors: Anson Lee, St. Clair, MI (US); Zhijian James Wu, Rochester Hills, MI (US)

(73) Assignee: DaimlerChrysler Corporation, Auburn HIlls, MI (US)

( * ) Notice: Subject to any disclaimer, the term of this patent is extended or adjusted under 35 U.S.C. 154(b) by 0 days.

(21) Appl. No.: 10/660,036

(22) Filed: Sep. 11, 2003

(65) Prior Publication Data

US 2005/0056086 A1 Mar. 17, 2005

(51) Int. Cl.
*G01M 15/00* (2006.01)
(52) U.S. Cl. .................................... 73/117.3
(58) Field of Classification Search ............... 73/35.01, 73/35.03, 35.06, 116, 117.2, 117.3, 118.1; 701/29, 101, 110, 111
See application file for complete search history.

(56) References Cited

U.S. PATENT DOCUMENTS

| | | | |
|---|---|---|---|
| 4,586,369 A * | 5/1986 | Vogler | 73/117.3 |
| 5,119,783 A * | 6/1992 | Komurasaki | 123/406.29 |
| 5,421,195 A * | 6/1995 | Wlodarczyk | 73/115 |
| 5,528,930 A * | 6/1996 | Park | 73/117.3 |
| 5,689,065 A * | 11/1997 | Kuroda et al. | 73/117.3 |
| 5,732,382 A | 3/1998 | Puskorius et al. | |
| 5,747,678 A * | 5/1998 | Angermaier | 73/116 |
| 5,837,887 A * | 11/1998 | Shibata et al. | 73/35.11 |
| 5,862,507 A | 1/1999 | Wu et al. | |
| 5,889,204 A * | 3/1999 | Scherer et al. | 73/118.2 |
| 6,006,155 A | 12/1999 | Wu et al. | |
| 6,131,444 A | 10/2000 | Wu et al. | |

* cited by examiner

*Primary Examiner*—Eric S. McCall
(74) *Attorney, Agent, or Firm*—Ralph E. Smith

(57) ABSTRACT

A method of detecting misfire events in an engine uses system identification technology. A linear model is determined for estimating engine firing events based on engine speed fluctuations. The linear model is represented as a difference equation. A Kalman filter is applied to the difference equation to determine unknown parameters of the linear model. Misfire events in the engine are detected based on the linear model.

12 Claims, 2 Drawing Sheets

ENGINE MISFIRE DETECTION USING SYSTEM IDENTIFICATION TECHNOLOGY

FIELD OF THE INVENTION

The present invention relates to internal combustion engines, and more particularly to engine misfire detection.

BACKGROUND OF THE INVENTION

Government regulations require automobile manufacturers to control the exhaust of engine combustion byproducts such as hydrocarbons, carbon monoxide, and nitrous oxide. Emission of such byproducts is typically controlled by a catalytic converter. However, if an automobile engine misfires, an increased amount of unburned combustion byproducts is passed through the catalytic converter. Engine misfire occurs as a result of the absence of spark in a cylinder, poor fuel metering, poor compression, or other similar conditions. Over time, regular engine misfire can lead to damage of the catalytic converter.

A difficulty in the development of an on-board real-time misfire detector is the determination of a unified algorithm to detect misfires with high detection accuracy and with no false alarms while maintaining a low implementation cost, under all required engine operating conditions and misfire patterns. These operating conditions include, but are not limited to, varying engine speeds, engine loads, road surfaces, gear positions, and mechanical dynamics. Furthermore, misfire patterns may be regular, random, or special sequences.

SUMMARY OF THE INVENTION

A method of detecting misfire in an engine comprises detecting engine speed fluctuations. A linear model is determined for estimating engine firing events based on the engine speed fluctuations. A Kalman filter is applied to the linear model to determine parameters of the linear model. A misfire event is detected in the engine based on the linear model.

In another aspect of the invention, a misfire detection system detects misfire in an engine. A sensor determines speed fluctuations of the engine. A controller executes a firing event model for estimating engine firing events based on the engine speed fluctuations. The controller applies a Kalman filter to the model to determine parameters of the model. A misfire detector detects a misfire event based on the model.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
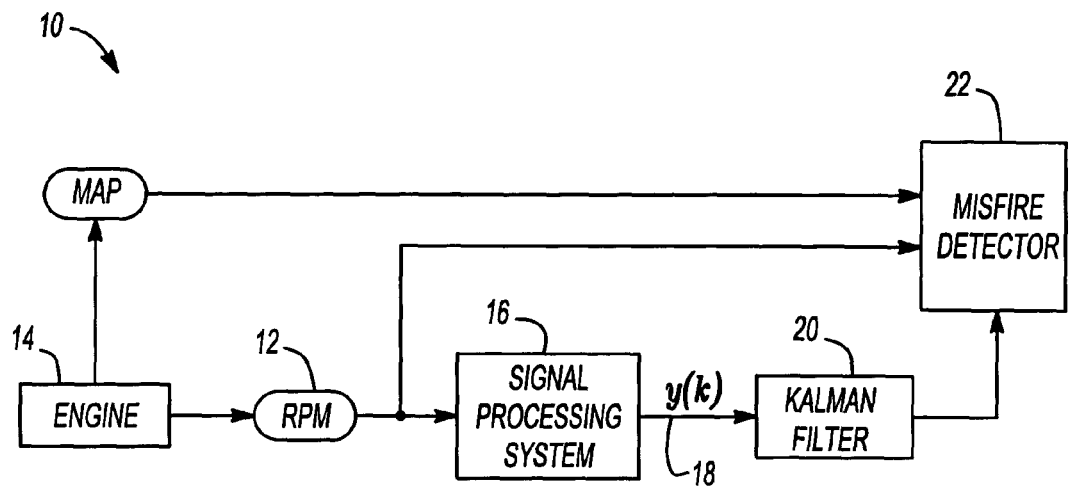
FIG. 1 is a functional block diagram of an engine misfire detection system according to the present invention.

The following description is merely exemplary in nature and is in no way intended to limit the invention, its application, or uses.

An engine combustion process is a dynamic system. Normal firing and misfire events are inputs that excite the system. Crankshaft speed fluctuates in response to the inputs. In other words, crankshaft speed fluctuation may be considered an output of the combustion process. Engine misfire detection may depend on several vehicle conditions. For example, crankshaft speed, average manifold absolute pressure, and firing event signals may be used to detect engine misfires. In particular, a current crankshaft speed is related to current and previous firing events, as well as previous crankshaft speeds. Therefore, engine misfire detection may be expressed as a general difference equation that describes the system in a crankshaft angular sampling domain k:

$$N(k)=H(\underline{N}, \underline{P}, \underline{I}) \qquad \text{(equation 1)}$$

Where
$\underline{N}=[N(k-1),N(k-2), \ldots N(k-n)]$;
$\underline{P}=[P(k),P(k-1), \ldots P(k-m)]$; and
$\underline{I}=[I(k),I(k-1), \ldots I(k-l)]$ In the above equations, N denotes crankshaft speed, P denotes the average manifold absolute pressure (MAP), and I denotes a firing event signal. The variables n, m, and l indicate previous samples of the crankshaft speed, MAP, and firing event signal, respectively.

An inverse model corresponding to the above crankshaft speed model may be described in a general form as follows:

$$I(k)=G(\underline{I}, \underline{N}, \underline{P}) \qquad \text{(equation 2)}$$

Where
$\underline{I}=[I(k-1),I(k-2), \ldots I(k-l)]$;
$\underline{N}=[N(k),N(k-1), \ldots N(k-n)]$; and
$\underline{P}=[P(k),P(k-1), \ldots P(k-m)]$ The inverse model implies that the current firing event signal may be inversely estimated from the current and past values of the crankshaft speed fluctuation, the MAP signal, and previous firing event signals. This is a non-linear discrete dynamic system with three inputs and one output. In general, it is very difficult to derive a detailed form of the non-linear dynamic function G. Therefore, misfire detection according to the present invention simplifies the above inverse model into the following form:

$$I(k)=R(\underline{N})Q(\underline{N},\underline{P}) \qquad \text{(equation 3)}$$

Where
$\underline{N}=[N(k),N(k-1), \ldots N(k-n)]$; and
$\underline{P}=[P(k),P(k-1), \ldots P(k-m)]$ The above model (equation 3) separates the non-linear dynamic function $G(\underline{I},\underline{N},\underline{P})$ from equation 2 into $R(\underline{N})$ and $Q(\underline{N},\underline{P})$. For the purposes of the present invention, the function $R(\underline{N})$ is an engine firing event estimator function. Misfire signatures are primarily embedded in the function $R(\underline{N})$. Therefore, the engine firing event estimator function plays a significant role in misfire detection. The function $Q(\underline{N},\underline{P})$ is a load compensator function.

The engine firing event estimator function $R(\underline{N})$ may be written as an $(m+1)^{th}$ order difference equation as follows:

$$y(k) = R(N(k), N(k-1), \ldots N(k-m)) \quad \text{(equation 4)}$$
$$= b_0 N(k) + b_1 N(k-1) + \ldots + b_m N(k-m) + v(k)$$

In the above difference equation, $b_i, i=0,1,\ldots,m$ are the model parameters and $v(k)$ represents measurement noise. The $y(k)$ term corresponds to the $I(k)$ term in equation 3. Furthermore, the $Q(\underline{N},\underline{P})$ function is simplified as a unitary gain in the difference equation. Because crankshaft speed N is a measured value, the model parameters $b_i, i=0,1,\ldots,m$ are the only unknown variables in the difference equation. Various system identification techniques may be used to estimate the model parameters of the difference equation. The engine misfire detection system of the present invention uses a Kalman filter to estimate the model parameters.

To use a Kalman filter to estimate the model parameters, the difference equation (equation 4) is first reformulated using standard state space systems equations as shown below:

$$x(k+1)=F(k)x(k)+B(k)u(k)+G(k)w(k) \quad \text{(equation 5)}$$

$$y(k)=H(k)x(k)+v(k) \quad \text{(equation 6)}$$

Where
$x_1(k)=b_0(k)+w_1(k)$
$X_2(k)=b_1(k)+W_2(k)$
$\ldots$
$x_{m+1}(k)=b_m(k)+W_{m+1}(k)$ In the above equations, $w_i(k)$ is a zero mean Gaussian noise vector, wherein $i=1,2,3,\ldots,m+1$. Therefore, the result is $x(k+1)=x(k)+w(k)$, where $$x(k) = \begin{bmatrix} b_0 \\ b_1 \\ b_2 \\ \vdots \\ b_m \end{bmatrix} \quad \text{(equation 7)}$$

The result of the above equation is a linear system equation that is equivalent to equation 5 with $F(k)=G(k)=I$, where I is a unitary matrix and $u(k)=0$.

Referring again to equation 6, if $H(k)=[N(k)\ N(k-1)\ N(k-2)\ldots N(k-m)]$, then equation 6 represents the same model as equation 4. Ultimately, the present model for misfire detection is represented by equations 6 and 7. In other words, equations 6 and 7 represent a firing events model. A Kalman filter estimator can be derived based on the model. The base equations of a Kalman filter are:

$$\hat{x}(k+1/k) = F(k)\hat{x}(k/k-1) + B(k)u(k) + G(k)\overline{w}(k) +$$
$$\left[F(k)\sum(k/k-1)H^T(k)+G(k)S(k)\right]\left[H(k)\sum(k/k-1)H^T(k)+R(k)\right]^{-1}$$
$$[y(k) - H(k)\hat{x}(k/k-1) - \overline{v}(k)]\hat{x}(0/-1) = \overline{x}(0)$$

Where $K(k)$ is the Kalman gain given by:

$$K(k)=[F(k)\Sigma(k/k-1)H^T(k)+G(k)S(k)][H(k)\Sigma(k/k-1)H^T(k)+R(k)]^{-1}$$

The base covariance equations are:

$$\Sigma(k+1/k)=F(k)\Sigma(k/k-1)F^T(k)+G(k)Q(k)G^T(k)-K(k)[F(k)\Sigma(k/k-1)H^T(k)+G(k)S(k)]^T$$

$$\Sigma(0/-1)=\Sigma(0)$$

The noise statistics assumptions are:

$$E[w(k)]=\overline{w}(k)$$

$$E[v(k)]=\overline{v}(k)$$

$$E\{[w(k)-\overline{w}(k)][w(j)-\overline{w}(j)]^T\}=Q(k)\delta_{kj}>0$$

$$E\{[v(k)-\overline{v}(k)][v(j)-\overline{v}(j)]^T\}=R(k)\delta_{kj}>0$$

$$E\{[w(k)-\overline{w}(k)][v(j)-\overline{v}(j)]^T\}=S(k)\delta_{kj}>0$$

$$E\{[x(0)-\overline{x}(0)][w(k)-\overline{w}(k)]^T\}=0$$

$$E\{[x(0)-\overline{x}(0)][v(k)-\overline{v}(k)]^T\}=0$$

Using the systems equations 6 and 7, a predictive Kalman filter equation can be simplified to:

$$x(k+1/k)=x(k/k-1)+K(k)[y(k)-H(k)x(k/k-1)] \quad \text{(equation 8)}$$

$$x(0/-1)=x(0)$$

$$\Sigma(k+1/k)=[I-K(k)H(k)]\Sigma(k/k-1)+Q(k)$$

$$\Sigma(0/-1)=\Sigma(0)$$

The vector $x(k)$ in equations 6 and 7 can be estimated from actual vehicle test data. This vector determines the "b" coefficients of the firing events model. The $H(k)$ term can be defined based on engine speed N. Therefore, the firing event signal $y(k)$ from equation 6 can be determined based on crankshaft speed N and the application of a Kalman filter to estimate the vector $x(k)$.

A misfire detection system 10 according to the present invention is shown in FIG. 1. An RPM sensor 12 senses a speed of an engine 14. The RPM sensor generates an engine speed signal and inputs the engine speed signal to a signal processing system 16. The signal processing system 16 processes the engine speed signal and derives a firing event signal $y(k)$ 18 according to the above equations and known engine characteristics. For example, the signal processing system correlates the engine speed signal to crankshaft speed. The firing event signal 18 is input to a Kalman filter 20.

The Kalman filter 20 estimates unknown parameters of the firing event signal 18. A misfire detector 22 determines engine misfire events according to an output of the Kalman filter 20. Additionally, the misfire detector 22 may consider other engine conditions to compensate for signal output variations caused by factors such as engine load. For example, an average manifold absolute pressure and the engine speed determine the $Q(\underline{N},\underline{P})$ term as shown in equation 3. The misfire detection system 10 may use a lookup table or a surface mapping function to determine $Q(\underline{N},\underline{P})$. Alternatively, other suitable methods may be used to determine $Q(\underline{N},\underline{P})$. For example, the signal processing system 16 and the misfire detector 22 may be combined in a single device.

Figure 2:
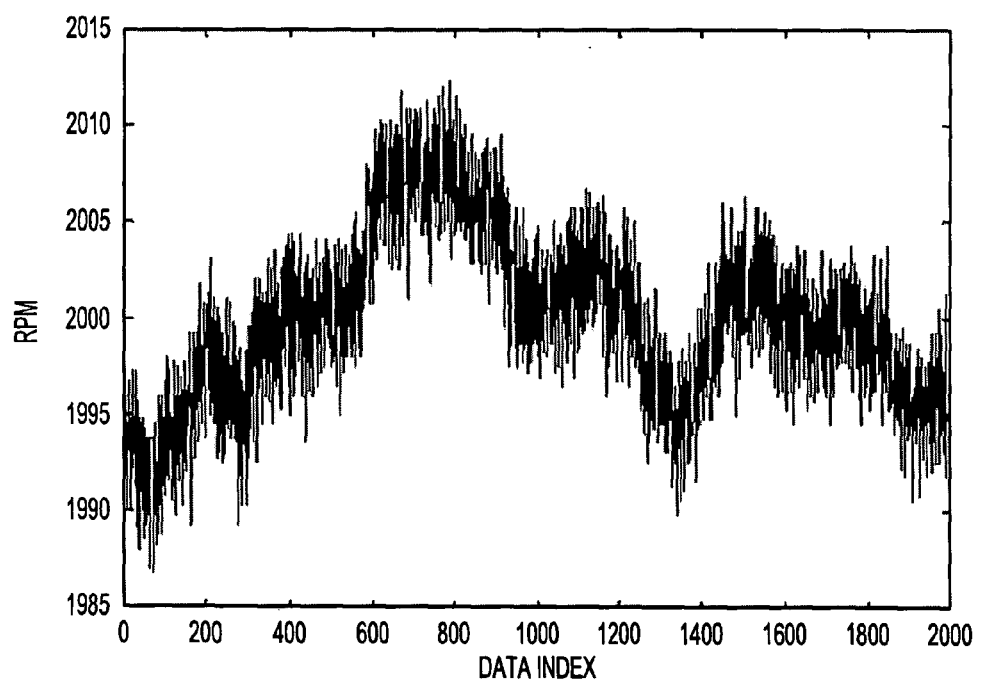
FIG. 2 illustrates an engine speed signal in an exemplary six cylinder engine.
Figure 3:
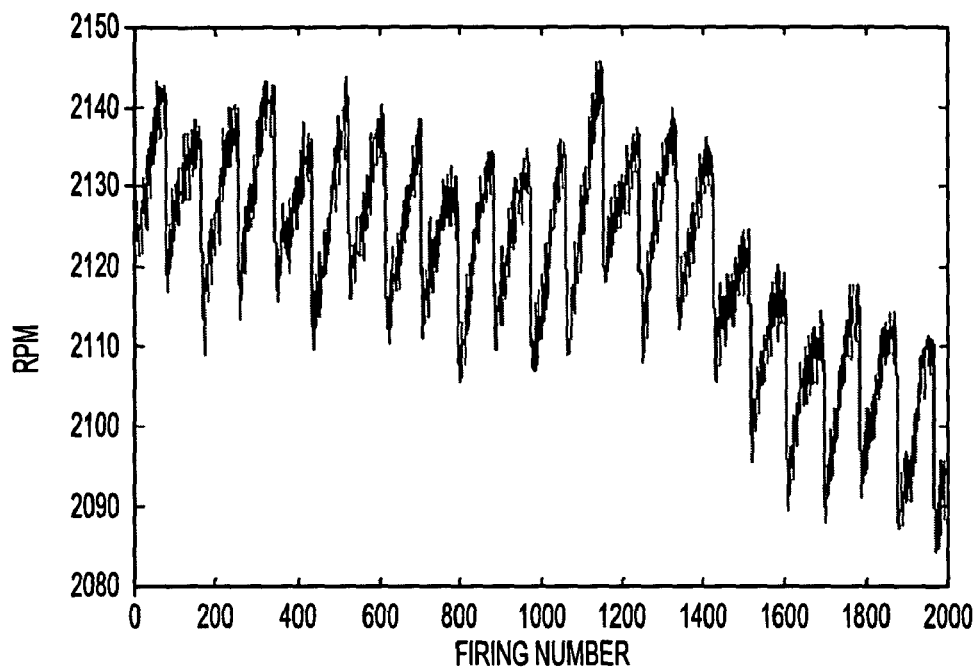
FIG. 3 illustrates an engine speed signal with misfire events in an exemplary six cylinder engine.
Figure 4:
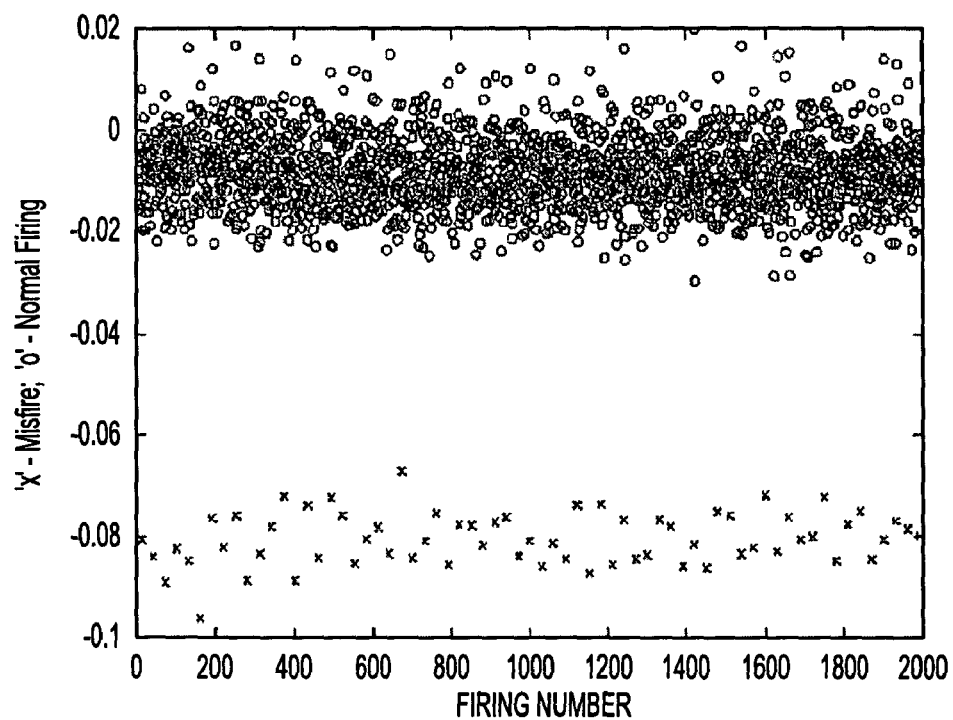
FIG. 4 illustrates a signal separation diagram according to the present invention.

FIG. 2 is an example of a six cylinder engine at 2000 RPM with no load and no misfire events. An engine speed signal depicts a plot of RPMs against a firing number. FIG. 3 illustrates a six cylinder engine speed signal with no load and 20% cylinder misfire. FIG. 4 is a signal separation diagram of the engine speed signal resulting from the present invention. The signal separation diagram plots misfire events and normal firing events against firing number, where "O" denotes a normal firing event and "X" denotes a misfire event. This plot depicts a signal to noise ratio of the misfire detection system according to the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of detecting misfire in an engine comprising:
   detecting engine speed fluctuations;
   determining a linear model for estimating engine firing events based on the engine speed fluctuations;
   applying a Kalman filter to the linear model to determine parameters of the linear model; and
   detecting a misfire event in the engine based on the linear model.

2. The method of claim 1 further comprising representing the linear model as a difference equation.

3. The method of claim 2 further wherein applying the Kalman filter includes estimating parameters of the difference equation.

4. The method of claim 3 wherein the linear model is an inverse linear model of a linear model of engine crankshaft speed.

5. The method of claim 4 wherein the difference equation is of the form $$y(k)=b_o N(k)+b_1 N(k-1)+\ldots+b_m N(k-m)+v(k)$$

where $b_0 \ldots b_m$ are the model parameters and N is the engine speed at sample k, k–1, ... k–m, where k and m are integers, and applying the Kalman filter to estimate parameters of the difference equation includes applying the Kalman filter to estimate the model parameters.

6. The method of claim 1 further comprising reformulating the linear model using standard state space systems equations.

7. The method of claim 1 further comprising determining a load compensator signal based on an engine speed and a manifold absolute pressure, wherein detecting the misfire event includes detecting the misfire event based on the firing event signal and the load compensator signal.

8. A method of detecting misfire in an engine comprising:
   detecting crankshaft speed fluctuations in the engine;
   determining a linear model for estimating engine firing events based on the crankshaft speed fluctuations;
   representing the linear model as a difference equation;
   estimating parameters of the difference equation at a Kalman filter to determine a firing event model; and
   detecting a misfire event in the engine based on the firing event model.

9. A misfire detection system that detects misfire in an engine comprising:
   a sensor that determines speed fluctuations of the engine;
   a controller that determines a firing event model for estimating engine firing events based on the speed fluctuations of the engine and applies a Kalman filter to the model to estimate parameters of the model; and
   a misfire detector that detects a misfire event based on the model.

10. A misfire detection system according to claim 9 wherein the firing event model is a difference equation.

11. A misfire detection system according to claim 10 wherein the Kalman filter estimates parameters of the difference equation.

12. The method of claim 9 wherein the controller determines a load compensator signal based on an engine speed and a manifold absolute pressure, and wherein the misfire detector detects the misfire event based on the firing event model and the load compensator signal.

* * * * *